(12) United States Patent
Yoneda

(10) Patent No.: US 7,495,691 B2
(45) Date of Patent: Feb. 24, 2009

(54) IMAGE PROCESSING APPARATUS

(75) Inventor: Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 10/986,824

(22) Filed: Nov. 15, 2004

(65) Prior Publication Data

US 2005/0122403 A1 Jun. 9, 2005

(30) Foreign Application Priority Data

Dec. 8, 2003 (JP) ............................. 2003-408751

(51) Int. Cl.
*H04N 5/228* (2006.01)
(52) U.S. Cl. ............... 348/208.4; 348/208.2; 348/208.6
(58) Field of Classification Search .................
348/208.99–208.16, 208.1
See application file for complete search history.

(56) References Cited

U.S. PATENT DOCUMENTS

| 5,712,474 | A | 1/1998 | Naneda | |
|---|---|---|---|---|
| 2002/0027599 | A1* | 3/2002 | Yamazaki | 348/208 |
| 2002/0051235 | A1* | 5/2002 | Rao et al. | 358/462 |
| 2003/0142218 | A1* | 7/2003 | Yamazaki | 348/208.6 |
| 2004/0056963 | A1* | 3/2004 | Ishikawa | 348/208.1 |

FOREIGN PATENT DOCUMENTS

| JP | 4-165775 | 6/1992 |
|---|---|---|
| JP | 2001-28708 | 1/2001 |
| JP | 2001-358999 | 12/2001 |

\* cited by examiner

*Primary Examiner*—Ngoc-Yen T Vu
*Assistant Examiner*—Joel Fosselman
(74) *Attorney, Agent, or Firm*—Oblon, Spivak, McClelland, Maier & Neustadt, P.C.

(57) ABSTRACT

An image processing apparatus is disclosed which includes: an imaging unit for taking a picture of an object using an image pickup device; a picture storing unit for storing the picture taken; a vibration detecting unit for detecting an amount of vibration applied to the imaging unit and outputting the detected amount of vibration; a compensation amount calculating unit for calculating an amount of compensation necessary for offsetting effects of the vibration on the imaging unit in accordance with the amount of vibration; a change amount calculating unit for calculating an amount of change in the amount of compensation between predetermined positions; a compensation limit determining unit for determining whether a limit of the compensation available for the picture stored in the picture storing unit is exceeded by the amount of change; a compensation amount adjusting unit for adjusting the amount of compensation depending on whether the limit of the compensation is exceeded, before outputting the adjusted amount of compensation; and a picture correcting unit for correcting the picture stored in the picture storing unit on the basis of the adjusted amount of compensation output by the compensation amount adjusting unit.

15 Claims, 14 Drawing Sheets

| LINE | ORIGINAL AMOUNT OF COMPENSATION | AMOUNT OF CHANGE IN COMPENSATION | ADJUSTED AMOUNT | FINAL COMPENSATION AMOUNT |
|---|---|---|---|---|
| 1 | A1 | | | A1 |
| 2 | A2 | Δ(A4 − A1) ↓ WITHIN RANGE | | A2 |
| 3 | A3 | | | A3 |
| 4 | A4 | | B4 | B4 |
| 5 | A5 | Δ(A7 − A4) ↓ OUT OF RANGE | B5 | B5 |
| 6 | A6 | | B6 | B6 |
| 7 | A7 | | B7 C7 | C7 |
| 8 | A8 | Δ(A10 − B7) ↓ OUT OF RANGE | C8 | C8 |
| 9 | A9 | | C9 | C9 |
| 10 | A10 | | C10 | C10 |
| 11 | A11 | Δ(A13 − C10) ↓ WITHIN RANGE | | A11 |
| 12 | A12 | | | A12 |
| 13 | A13 | | | A13 |
| 14 | A14 | Δ(A16 − A13) ↓ WITHIN RANGE | | A14 |
| 15 | A15 | | | A15 |
| 16 | A16 | | | A16 |
| 17 | A17 | Δ(A19 − A16) ↓ WITHIN RANGE | | A17 |
| 18 | A18 | | | A18 |
| 19 | A19 | Δ(A20 − A19) ↓ WITHIN RANGE | | A19 |
| 20 | A20 | | | A20 |

Background Art

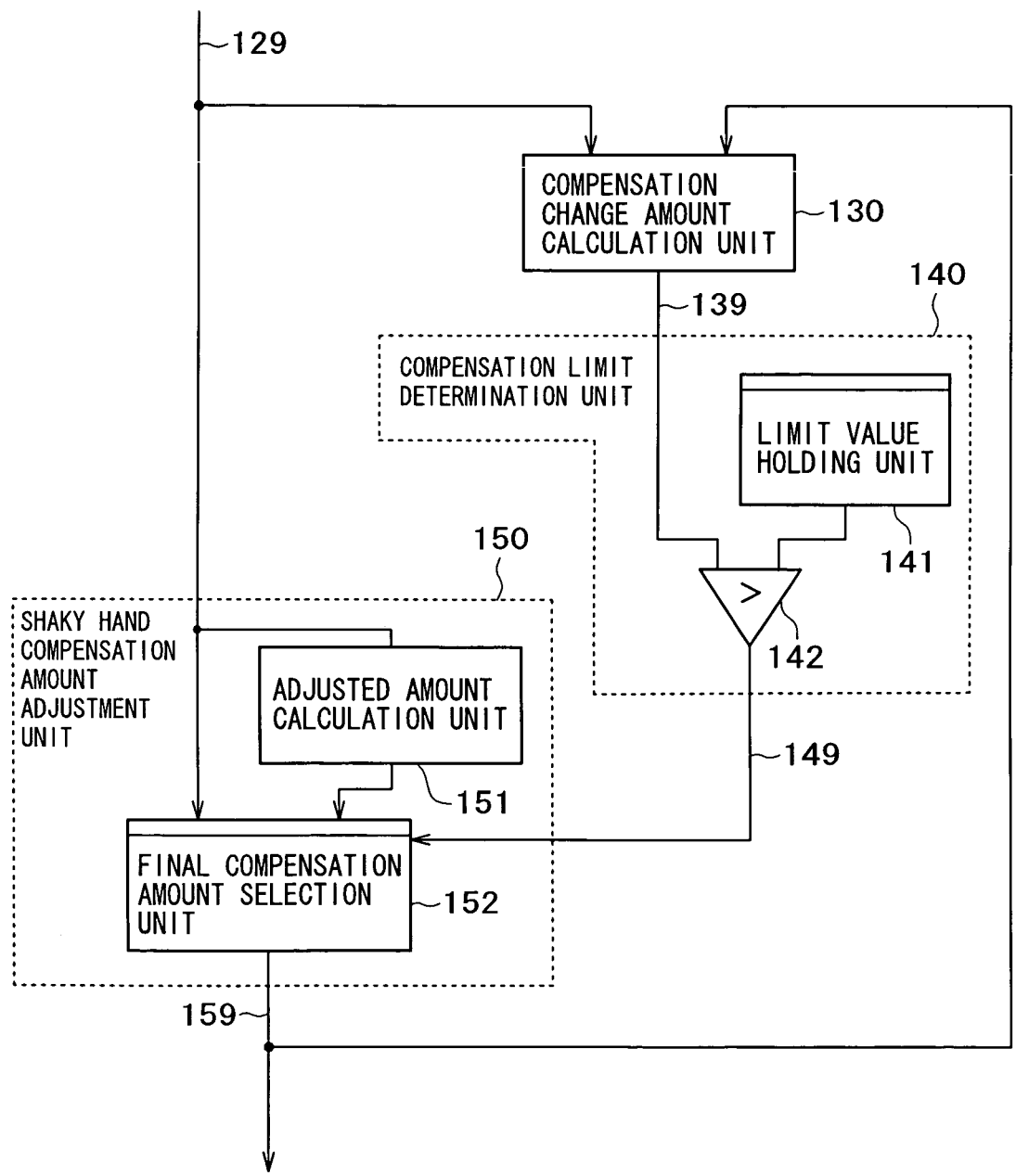

F I G. 1 0

| LINE | ORIGINAL AMOUNT OF COMPENSATION | AMOUNT OF CHANGE IN COMPENSATION | ADJUSTED AMOUNT | | FINAL COMPENSATION AMOUNT |
|---|---|---|---|---|---|
| 1 | A1 | | | | A1 |
| 2 | A2 | $\triangle$(A4 − A1) ↓ WITHIN RANGE | | | A2 |
| 3 | A3 | | | | A3 |
| 4 | A4 | | B4 | | B4 |
| 5 | A5 | $\triangle$(A7 − A4) ↓ OUT OF RANGE | B5 | | B5 |
| 6 | A6 | | B6 | | B6 |
| 7 | A7 | | B7 | C7 | C7 |
| 8 | A8 | $\triangle$(A10 − B7) ↓ OUT OF RANGE | | C8 | C8 |
| 9 | A9 | | | C9 | C9 |
| 10 | A10 | | | C10 | C10 |
| 11 | A11 | $\triangle$(A13 − C10) ↓ WITHIN RANGE | | | A11 |
| 12 | A12 | | | | A12 |
| 13 | A13 | | | | A13 |
| 14 | A14 | $\triangle$(A16 − A13) ↓ WITHIN RANGE | | | A14 |
| 15 | A15 | | | | A15 |
| 16 | A16 | | | | A16 |
| 17 | A17 | $\triangle$(A19 − A16) ↓ WITHIN RANGE | | | A17 |
| 18 | A18 | | | | A18 |
| 19 | A19 | | | | A19 |
| 20 | A20 | $\triangle$(A20 − A19) ↓ WITHIN RANGE | | | A20 |

EXTRAPOLATION POINT OF $\Delta(G4 - G1)$

IMAGE PROCESSING APPARATUS

BACKGROUND OF THE INVENTION

The present invention relates to an image processing apparatus. More particularly, the invention relates to an image processing apparatus for calculating the amount of compensation for the effects caused by vibrations, a method for causing the apparatus to make the calculations, and a program for causing a computer to execute the method.

Portable video cameras have come into general use today. These cameras typically include a charge transfer type solid-state image pickup device exemplified by the CCD (Charge Coupled Device) sensor, or an X-Y address type solid-state image pickup device represented by the CMOS (Complementary Metal Oxide Semiconductor) sensor.

Driven on a single low voltage, the CMOS sensor consumes less power than the CCD sensor and is more suitable for integration with its peripheral circuits. These advantages have prompted researchers to consider adopting the CMOS sensor for use in the image processing apparatus such as video cameras.

However, it has been found difficult to use the CMOS sensor as the image pickup device of the video camera or other image processing apparatuses with a view to recording moving or still pictures of high quality. A major reason for that difficulty is the presence of distortions in pictures taken by the camera being held by shaky hands. In the case of the CCD sensor that has been prevalent as the image pickup device for the image processing apparatus, a single value calculated on the basis of shaky hand information obtained per field or per frame is used as the amount of compensation for minimizing the adverse effects on pictures caused by shaky hands. The use of a single value for shaky hand compensation is made possible by the fact that the period of exposure is equal for all pixels of the CCD sensor with no distortion in pictures resulting therefrom.

As opposed to the CCD sensor, the CMOS sensor is prone to picture distortions stemming from shaky hands because the CMOS device takes pictures of an object in a manner different from the way the CCD sensor operates, as outlined below.

The charge transfer type solid-state image pickup device such as the CCD sensor is capable of exposing all pixels at the same time in reading pixel data. By contrast, the X-Y address type solid-state image pickup device such as the CMOS sensor reads pixel data one pixel or one line at a time. While pixel data is being read, the time it takes for the pixel-reading solid-state image pickup device to move from one pixel to another per line is only negligible when compared with the time it takes for its line-reading counterpart to move from one line to another. Thus the argument that follows will only take the differences in time period between lines into consideration, as shown in FIGS. 1A and 1B.

Illustratively, FIG. 1A shows how a CMOS sensor reads all pixels at intervals of 1/T seconds, with each picture formed by lines #1 through #N. FIG. 1B depicts an example in which the period of exposure starts at time t1 and ends at time t2 for line #1, ends at time t3 for line #2, and ends at time t4 for line #3.

The time difference between t2 and t3 is given as Δt, and the difference between t3 and t4 also as Δt. That is, the exposure period involves the time difference of Δt per line. In this case, there arises a time difference close to 1/T seconds during exposure between line #1 at the top of the picture and line #N at the bottom. With such a difference in terms of exposure period taking place between line #1 and #N per picture, the exposure time difference per line contributes to letting the CMOS sensor held by shaky hands distort pictures of an object being imaged.

How pictures taken of the object are distorted is explained below by referring to FIG. 2. FIG. 2 shows examples of a rectangle 20 being taken as the object in picture 10. The picture in the middle shows a distortion-free object taken by an image processing apparatus not held by shaky hands. The normally imaged object is shown as the correctly formed rectangle 20.

The right-hand side picture in FIG. 2 shows a distorted object taken by an image processing apparatus shaken rightward. Similarly, the left-hand side picture indicates a distorted object taken by an image processing apparatus shaken leftward. The top picture in FIG. 2 illustrates a vertically elongated object taken by an image processing apparatus shaken upward; and the bottom picture presents a vertically compressed object taken by an image processing apparatus shaken downward.

As described, the CMOS sensor is subject to exposure period differences between lines (i.e., differences in imaging timing between lines). For that reason, it is impossible to fully compensate for the adverse effects of shaky hands by use of a single value calculated on the basis of shaky hand information obtained per field or per frame. The result is a cluster of distorted pictures being presented to the user.

Some image processing apparatus that compensate for the picture distortion caused by shaky hands have been proposed. One such apparatus is disclosed illustratively in Japanese Patent Application No. 2001-358999. This image processing apparatus is designed to change its read position per line to compensate for horizontal vibrations of the hands while changing vertically the position of each line from which to read in order to compensate for vertical vibrations of the hands.

The proposed technique above, however, fails to consider the limits of shaky hand compensation, to be discussed below. That failure can lead to unnaturally formed pictures. Some problems associated with the limits of shaky hand compensation will now be described with reference to FIGS. 3A and 3B. These two figures show what can take place because of the limits of compensation existing in the horizontal and vertical directions. With measures taken to compensate for the shaky hands per line, each figure illustrates relative positional relations between a picture data area held in a memory before compensation on the one hand, and a picture data area in effect after the compensation on the other hand.

FIG. 3A shows a state in which an original object 21 is imaged into a picture data area 11 provided in the memory but the obtained image is distorted into a picture 31 due to shaky hands. In this state, the amount of horizontal vibrations from the shaky hands is so large that a corner 41 of the picture 31 has overflowed the picture data area 11. That means the picture data subsequent to line #j in the picture data area 11 is not sufficient for subsequent compensation.

Likewise, FIG. 3B indicates a state where an original object 22 is imaged into a picture data area 12 provided in the memory but the obtained image is distorted into a picture 32 because of shaky hands. In this state, the amount of vertical vibrations from the shaky hands is so large that a portion 42 of the picture 32 has overflowed the picture data area 12. That means the picture data subsequent to line #k in the picture data area 12 is insufficient for subsequent compensation.

As described above, the CMOS sensor attempting to make shaky hand compensation without regard to the limits of the compensation could fail to provide full picture data following the compensation. The ultimately formed pictures tend to be distorted, giving viewers an awkward, uncomfortable impression.

The present invention has been made in view of the above circumstances and provides an image processing apparatus which, when compensating for the adverse effects on pictures caused by shaky hands or some other vibrating sources, does not overcompensate for the pictures exceeding the limits of the compensation.

SUMMARY OF THE INVENTION

In achieving the foregoing and other objects of the present invention and according to a first aspect thereof, there is provided an image processing apparatus including: an imaging unit for taking a picture of an object using an image pickup device; a picture storing unit for storing the picture taken; a vibration detecting unit for detecting an amount of vibration applied to the imaging unit and outputting the detected amount of vibration; a compensation amount calculating unit for calculating an amount of compensation necessary for offsetting effects of the vibration on the imaging unit in accordance with the amount of vibration; a change amount calculating unit for calculating an amount of change in the amount of compensation between predetermined positions; a compensation limit determining unit for determining whether a limit of the compensation available for the picture stored in the picture storing unit is exceeded by the amount of change; a compensation amount adjusting unit for adjusting the amount of compensation depending on whether the limit of the compensation is exceeded, before outputting the adjusted amount of compensation; and a picture correcting unit for correcting the picture stored in the picture storing unit on the basis of the adjusted amount of compensation output by the compensation amount adjusting unit. The apparatus of this structure adjusts the amount of compensation for offsetting the effects of the vibration depending on whether the limit of the compensation is exceeded.

Preferably, the image pickup device may be accessed by use of two-dimensional addresses. Giving access to the image pickup device based on two-dimensional addresses allows the inventive apparatus to operate more effectively when addressing the occurrence of a difference in exposure time between lines.

The image pickup device may preferably be a complementary metal oxide semiconductor (CMOS) image sensor. The CMOS image sensor allows the inventive apparatus to work more effectively in dealing with the difference taking place in exposure time between lines.

Preferably, the predetermined positions may be line positions of the picture storing unit. With this structure, a check can be made to determine whether the limit of the compensation is exceeded on the basis of the amount of change in compensation between the lines, whereby the compensation amount per line is adjusted.

Preferably, the compensation limit determining unit may further include: a limit value holding unit for holding a limit value that uniformly defines a tolerable amount of change between the predetermined positions; and a determining unit for determining whether the limit of the compensation is exceeded when the limit value is exceeded by the amount of change calculated by the change amount calculating unit. This structure makes it possible to determine whether the limit of the compensation is exceeded on the basis of the limit value uniformly defined earlier.

The limit value may preferably be a value that uniformly distributes to each of the predetermined positions the difference between the amount of compensation in the start position and the amount of compensation in the end position. This structure makes it possible to determine whether the limit of the compensation is exceeded on the basis of the limit value distributed uniformly to each of the predetermined positions.

Preferably, the compensation limit determining unit may further include: a range holding unit for holding a range of the predetermined positions for the picture storing unit; an extrapolating unit for calculating an extrapolation value for the predetermined positions based on the amount of change calculated by the change amount calculating unit; and a determining unit for determining whether the limit of the compensation is exceeded when the range held by the range holding unit is exceeded by the extrapolation value. This structure makes it possible to determine whether the limit of the compensation is exceeded by the extrapolation value based on the amount of change in each of the predetermined positions.

Preferably, the compensation amount adjusting unit may further include: an adjusted amount calculating unit for making a predetermined calculation on the amount of compensation to acquire an adjusted amount; and a final compensation amount selecting unit for outputting the adjusted amount as the amount of compensation if the compensation limit determining unit determines that the limit of the compensation is exceeded, the final compensation amount selecting unit further outputting the amount of compensation unadjusted if the compensation limit determining unit determines that the limit of the compensation is not exceeded. Where the limit of the compensation is found to have been exceeded, this structure makes it possible to output the adjusted amount acquired through the predetermined calculation as the final amount of compensation.

According to a second aspect of the invention, there is provided a compensation amount calculating method for use with an image processing apparatus including: an imaging unit for taking a picture of an object using an image pickup device; a picture storing unit for storing the picture taken; a vibration detecting unit for detecting an amount of vibration applied to the imaging unit and outputting the detected amount of vibration; and a picture correcting unit for correcting the picture stored in the picture storing unit in accordance with the amount of compensation ultimately obtained on the basis of the amount of vibration; the compensation amount calculating method including the steps of: calculating the amount of compensation necessary for offsetting effects of the vibration on the imaging unit in accordance with the amount of vibration; calculating an amount of change in the amount of compensation between predetermined positions; determining whether a limit of the compensation available for the picture stored in the picture storing unit is exceeded based on the amount of change; and making a predetermined calculation on the amount of compensation to acquire an adjusted amount before outputting the adjusted amount as the amount of compensation if the limit of the compensation is found to have been exceeded, the amount of compensation being output unadjusted if the limit of the compensation is not found to have been exceeded. The inventive method allows the image processing apparatus to adjust the amount of compensation for offsetting the effects of the vibration depending on whether the limit of the compensation is exceeded.

According to a third aspect of the invention, there is provided a program for use by a computer for controlling an image processing apparatus including: an imaging unit for taking a picture of an object using an image pickup device; a picture storing unit for storing the picture taken; a vibration detecting unit for detecting an amount of vibration applied to the imaging unit and outputting the detected amount of vibration; and a picture correcting unit for correcting the picture stored in the picture storing unit in accordance with the amount of compensation ultimately obtained on the basis of the amount of vibration; the program causing the computer to carry out the steps of: calculating an amount of compensation necessary for offsetting effects of the vibration on the imaging unit in accordance with the amount of vibration; calculating an amount of change in the amount of compensation between predetermined positions; determining whether a limit of the compensation available for the picture held in the picture storing unit is exceeded based on the amount of change; and making a predetermined calculation on the amount of compensation to acquire an adjusted amount before outputting the adjusted amount as the amount of compensation if the limit of the compensation is found to have been exceeded, the amount of compensation being output unadjusted if the limit of the compensation is not found to have been exceeded. This program allows the computer controlling the image processing apparatus to adjust the amount of compensation for offsetting the effects of the vibration depending on whether the limit of the compensation is exceeded.

As outlined above, when compensation is provided by the inventive scheme to offset the effects of shaky hands or like variations on pictures taken, a check is made to determine whether a predetermined limit of the compensation is exceeded. If the limit of the compensation for a given picture is found to have been exceeded, the amount of compensation is adjusted so as to avert overcompensation of that picture. The scheme contributes to making the compensation-corrected pictures look natural and unaffected.

Other objects, features and advantages of the present invention will become more apparent in the following specification and accompanying drawings.

BRIEF DESCRIPTION OF THE DRAWINGS

FIG. 9 is a block diagram of a functional setup implemented by the inventive image processing apparatus operating by a first method of this invention;

FIG. 10 is a tabular view listing final amounts of compensation acquired by the inventive image processing apparatus operating by the first method of the invention;

DESCRIPTION OF THE PREFERRED EMBODIMENTS

Figure 1A:
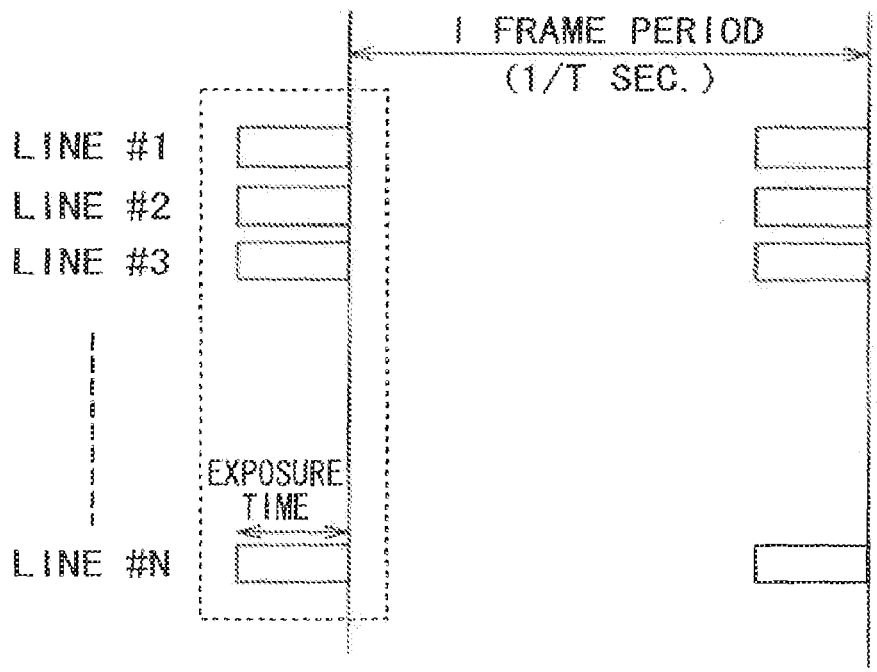
FIGS. 1A and 1B are schematic views indicating differences in exposure time between a CCD sensor and a CMOS sensor.
Figure 1B:
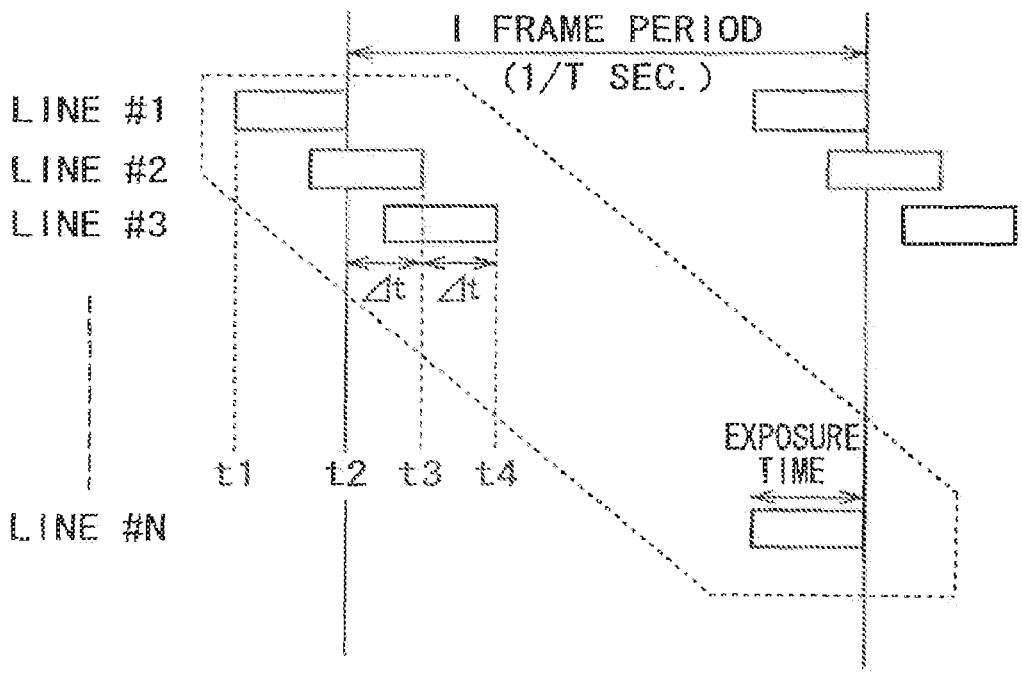
Figure 2:
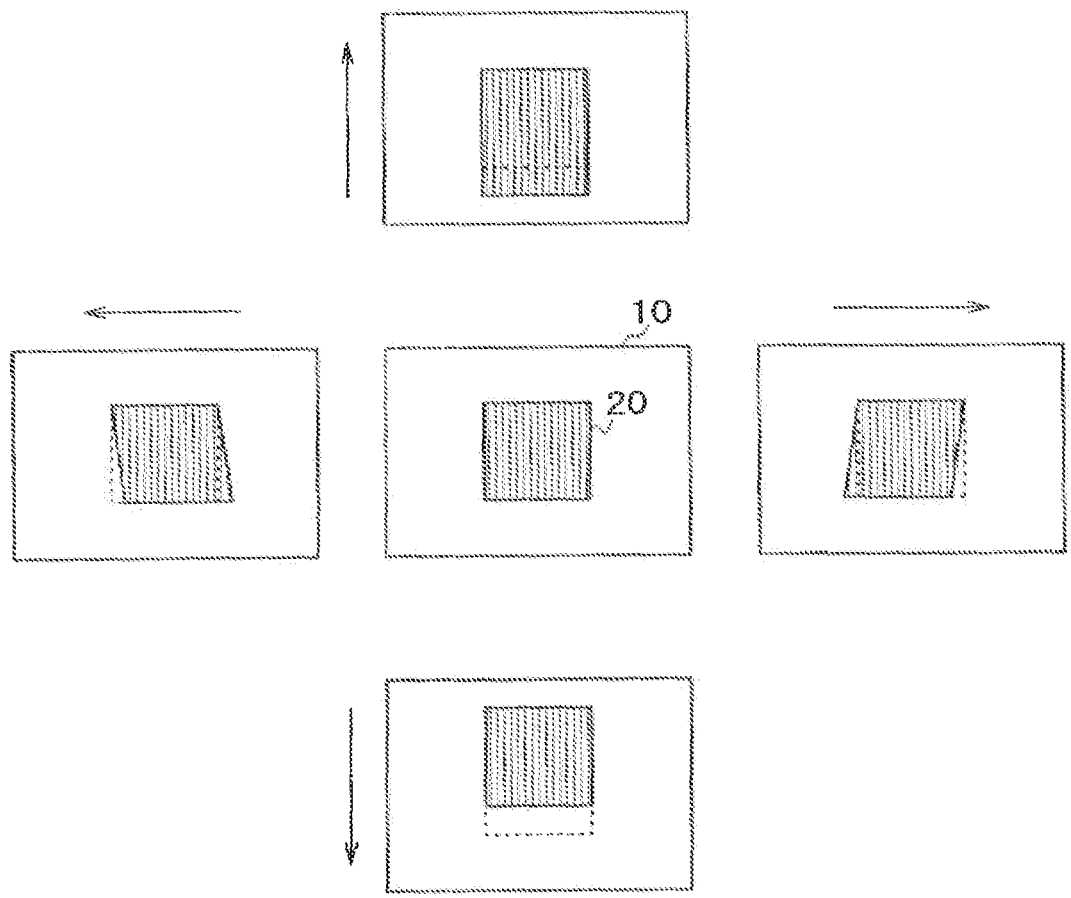
FIG. 2 is a schematic view showing how an object being imaged by the CMOS sensor is affected by shaky hands.
Figure 3A:
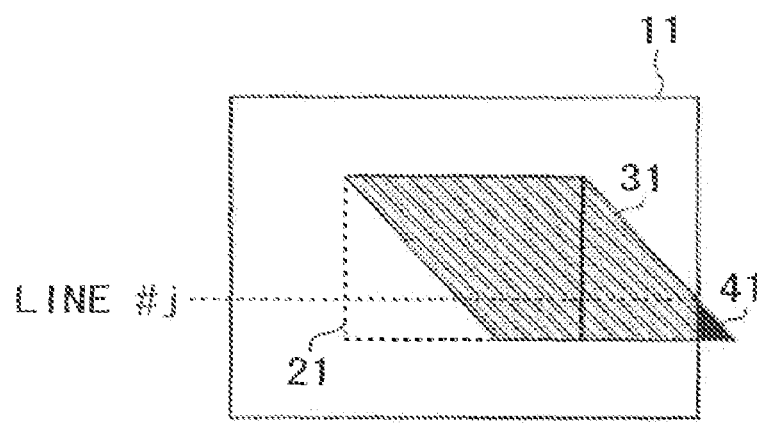
FIGS. 3A-and 3B are schematic views illustrating limits of compensation in a picture data area.
Figure 3B:
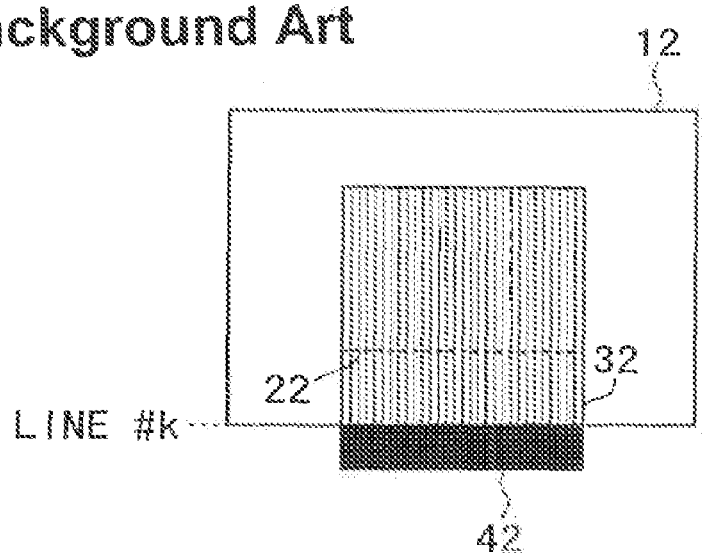
Figure 4:
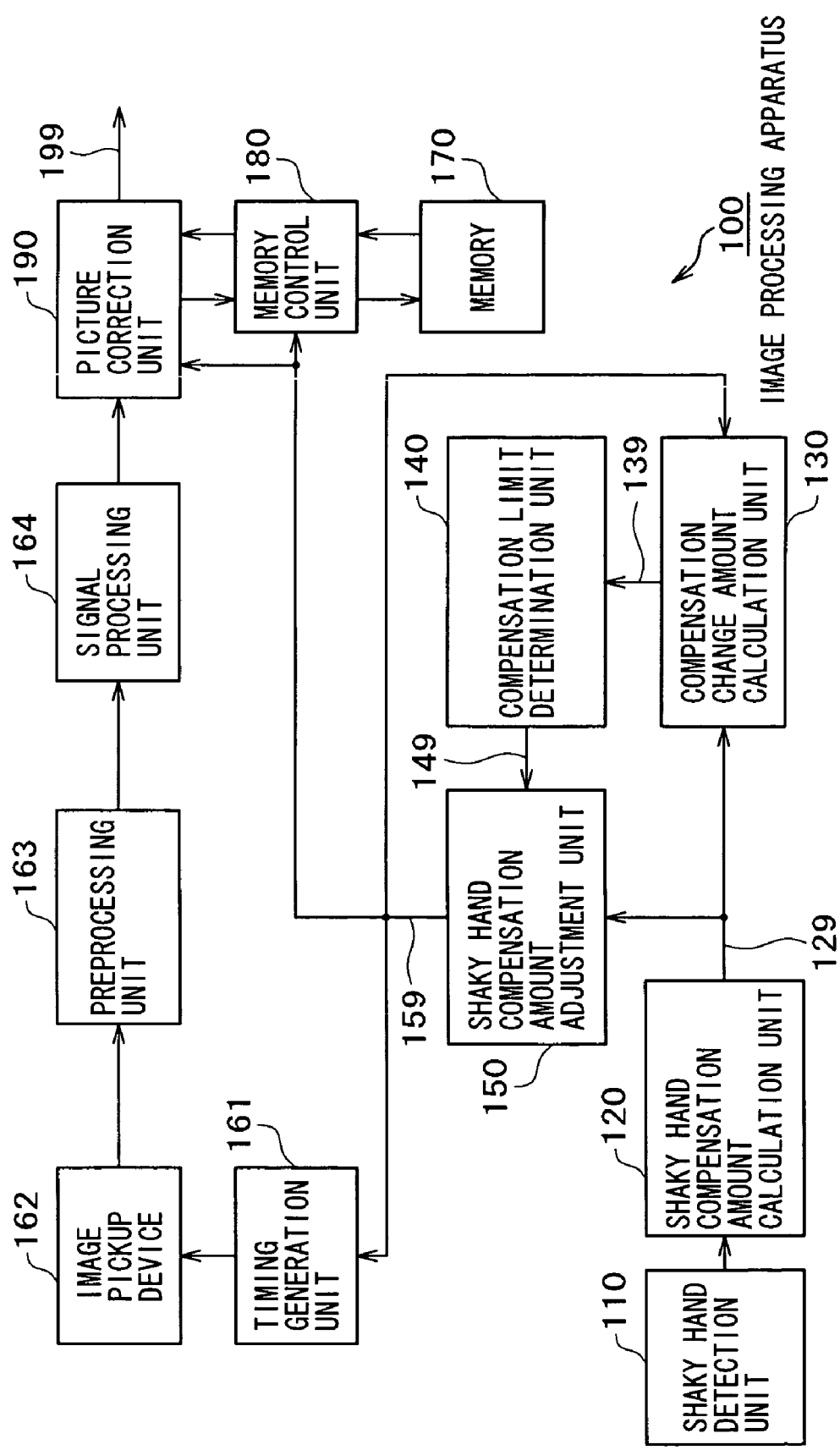
FIG. 4 is a block diagram of an image processing apparatus embodying this invention.

Preferred embodiments of this invention will now be described with reference to the accompanying drawings. FIG. 4 is a block diagram of an image processing apparatus 100 embodying this invention. In order to calculate amounts of compensation for offsetting the effects of vibration from shaky hands or other sources on pictures being taken, the image processing apparatus 100 includes: a shaky hand detection unit 110, a shaky hand compensation amount calculation unit 120, a compensation change amount calculation unit 130, a compensation limit determination unit 140, and a shaky hand compensation amount adjustment unit 150. To take pictures, the image processing apparatus 100 uses a timing generation unit 161, an image pickup device 162, a preprocessing unit 163, and a signal processing unit 164. To correct the pictures being taken, the image processing apparatus 100 adopts a memory 170, a memory control unit 180, and a picture correction unit 190.

The shaky hand detection unit 110 detects vibrations applied to the image processing apparatus 100 and outputs the detected amount of vibration. The shaky hand detection unit 110 may be implemented either by sensor such as an angular velocity sensor or through image processing. If the shaky hand detection unit 110 is implemented by an angular velocity sensor, the sensor supplies the shaky hand compensation amount calculation unit 120 with detected amounts of vibration based on data about the angular velocities being measured in the pitching and yawing directions of the apparatus 100.

On the basis of the amounts of vibration fed from the shaky hand detection unit 110, the shaky hand compensation amount calculation unit 120 calculates an amount of compensation for offsetting the effects of the detected vibrations on the image processing apparatus 100. More specifically, the shaky hand compensation amount calculation unit 120 calculates, either per line or at intervals of a plurality of lines, the amount of the compensation necessary for offsetting the effects of the applied vibrations using the data from the shaky hand detection unit 110. The shaky hand compensation amount calculation unit 120 sends the calculated amount of compensation to the compensation change amount calculation unit 130 and shaky hand compensation amount adjustment unit 150 over a signal line 129.

The compensation change amount calculation unit 130 calculates an amount of change in compensation between predetermined lines. In calculating the amount of change in compensation, the compensation change amount calculation unit 130 may utilize either the amount of compensation fed from the shaky hand compensation amount calculation unit 120 or the final amount of compensation coming from the shaky hand compensation amount adjustment unit 150. The compensation change amount calculation unit 130 supplies the calculated amount of change to the compensation limit determination unit 140 over a signal line 139.

Based on the amount of change coming from the compensation change amount calculation unit 130, the compensation limit determination unit 140 checks to determine whether a limit of compensation is exceeded for pictures in a picture data area within the memory 170. The result of the check is sent to the shaky hand compensation amount adjustment unit 150 over a signal line 149.

Depending on the result of the check on the compensation limit from the compensation limit determination unit 140, the shaky hand compensation amount adjustment unit 150 adjusts the amount of compensation supplied from the shaky hand compensation amount calculation unit 120 and outputs what is adjusted as the final amount of compensation per line. The final amount of compensation is calculated per line because the solid-state image pickup device exemplified by the CMOS sensor reads picture data successively on a line by line basis as mentioned above. The shaky hand compensation amount adjustment unit 150 sends the final amount of compensation thus calculated to the compensation change amount calculation unit 130, timing generation unit 161, memory control unit 180, and picture correction unit 190 over a signal line 159.

The image pickup device 162, a device that takes pictures, is constituted illustratively by an X-Y address (two-dimensional address) type solid-state image pickup device such as a CMOS image sensor. The timing generation unit 161 generates a read timing signal to be used by the image pickup device 162. In keeping with the timing signal from the timing generation unit 161, the image pickup device 162 supplies captured picture data to the preprocessing unit 163.

The preprocessing unit 163 converts the picture data coming from the image pickup device 162 into picture data in digital form, and sends the digitized picture data to the signal processing unit 164. The signal processing unit 164 generates YUV signals by retrieving illustratively luminance and color difference signals from the picture data supplied by the preprocessing unit 163. The generated signals are forwarded to the picture correction unit 190. The signals to be generated are not limited to the YUV signals; they may be RGB signals instead.

The memory 170 contains a picture data area for temporarily storing the picture to be corrected. The memory control unit 180 provides access control over the memory 170. The picture data fed to the picture correction unit 190 is accommodated temporarily in the memory 170 placed under control of the memory control unit 180. The picture data is then read from the memory 170 and sent to the picture correction unit 190 under control of the memory control unit 180. The picture correction unit 190 subjects the supplied picture data to its shaky hand compensation process and outputs the corrected data over a signal line 199. The output picture data is recorded to a recording medium (not shown) or displayed on a display device (not shown).

The final amount of compensation coming from the shaky hand compensation amount adjustment unit 150 is sent to the picture correction unit 190 for use in the picture correction process. The final amount of compensation is also supplied to the timing generation unit 161 which adjusts the read timing of the image pickup device 162 for picture correction.

Whereas the final amount of compensation needs to be calculated line by line, the timing in which the amount of vibration from shaky hands is acquired is dependent on the sampling frequency of the shaky hand detection unit 110. That is, a sufficient amount of vibration for calculating the final amount of compensation for each line may not be provided. If the sampling frequency of the shaky hand detection unit 110 differs from the read frequency of the image pickup device 162, the shaky hand detection unit 110 or shaky hand compensation amount calculation unit 120 carries out interpolations in acquiring the amount of shaky hand compensation per line. Similarly, if the sampling frequency of the shaky hand detection unit 110 is the same as the read frequency of the image pickup device 162 but the devices differ in phase, it is also necessary for the shaky hand detection unit 110 or shaky hand compensation amount calculation unit 120 to execute interpolations. The interpolation process will be discussed later.

Figure 5A:
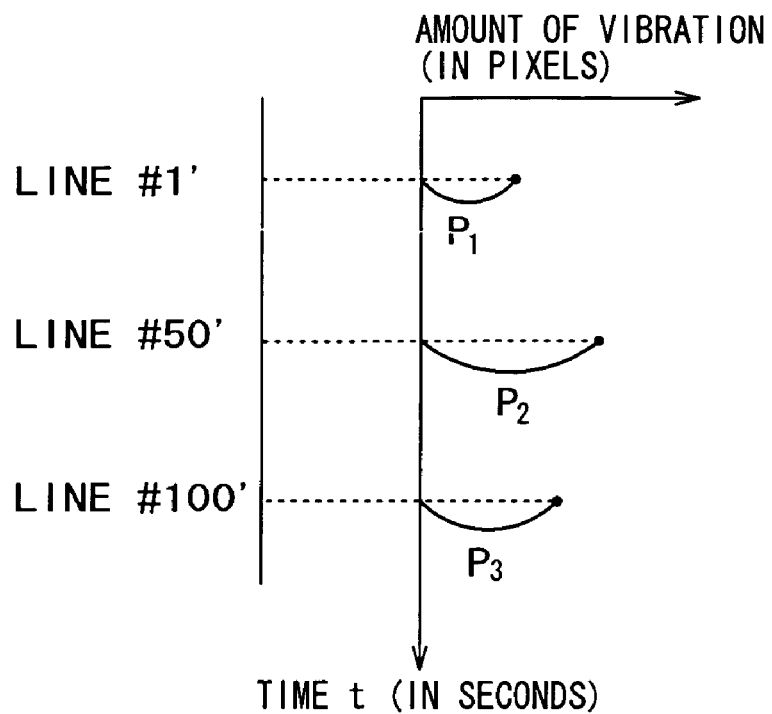
FIGS. 5A and 5B are schematic views showing amounts of vibration from shaky hands and a picture being affected by such vibration.
Figure 5B:
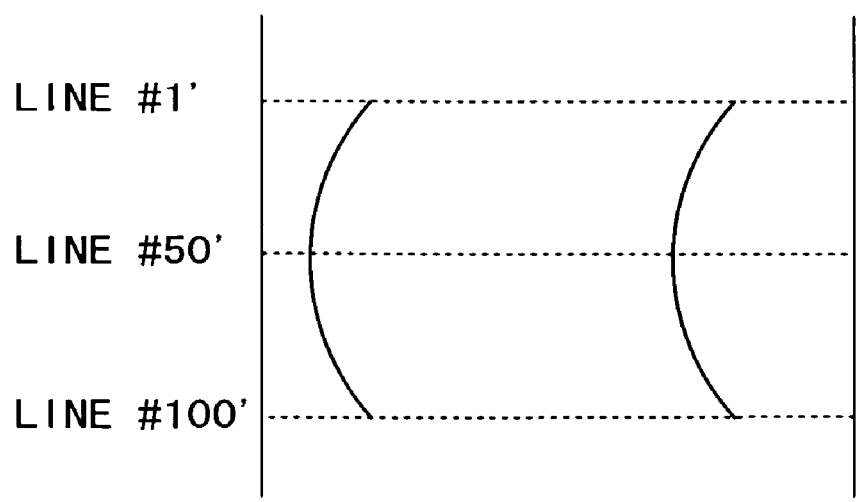

FIGS. 5A and 5B schematically show typical amounts of vibration from shaky hands and a picture being affected by such vibration. FIG. 5A indicates an example in which three amounts of vibration are acquired for 100 lines. In this case, the shaky hand detection unit 110 is assumed to have obtained the amounts of vibration for lines #1', #50', and #100'. Line #1' serves as the reference line for explanation purposes and is one of the lines constituting the picture taken.

In FIG. 5A, the amount of vibration is shown consisting of P1 pixels for line #1' being read, P2 pixels for line #50', and P3 pixels for line #100'. The amounts of vibration are given in increments of pixels including fractions, so that subsequent compensation in increments of quantities less than a pixel is made possible.

The vibration amounts P1 through P3 represent differences with regard to the amount of vibration acquired immediately after the start of the picture-taking process. In the state shown in FIG. 5A, the shaky hands were found swung rightward for line #1' and continued in the movement up to line #50', then swung leftward up to line #100'.

Illustratively, suppose that a picture is taken of a rectangle that is stationary as an object and that the vibrations from shaky hands such as those shown in FIG. 5A are applied to the image processing apparatus 100. In that case, a distorted picture shown in FIG. 5B would be presented to the user if no compensation were made for the vibrations being applied. The vibrations from shaky hands thus need to be compensated for so that a picture as close to the original picture as possible will be presented to the user.

To compensate for the vibration from shaky hands per line requires acquiring the amount of vibration for each line. However, in the example illustrated in FIGS. 5A and 5B, the amounts of vibration are acquired only for lines #1', #50', and #100'. The availability of such discrete data only is attributed to the fact that the shaky hand detection unit 110 depends on the sampling frequency for shaky hand detection. In this case, the amounts of vibration from shaky hands not available for lines #2' through #49' as well as for lines #51' through #99' need to be interpolated per line.

Figure 6A:
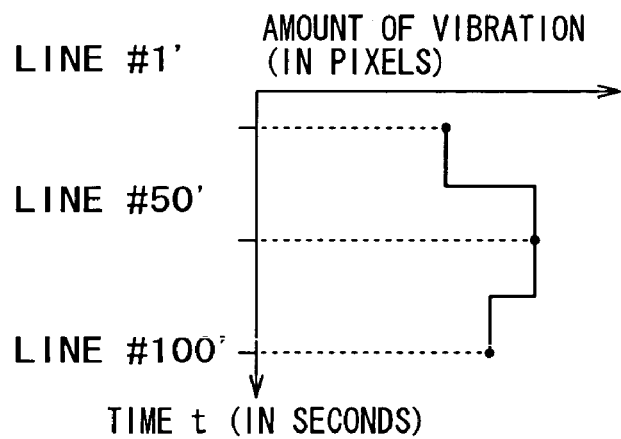
FIGS. 6A, 6B and 6C are schematic views sketching how amounts of vibration are interpolated by the embodiment of the invention.
Figure 6B:
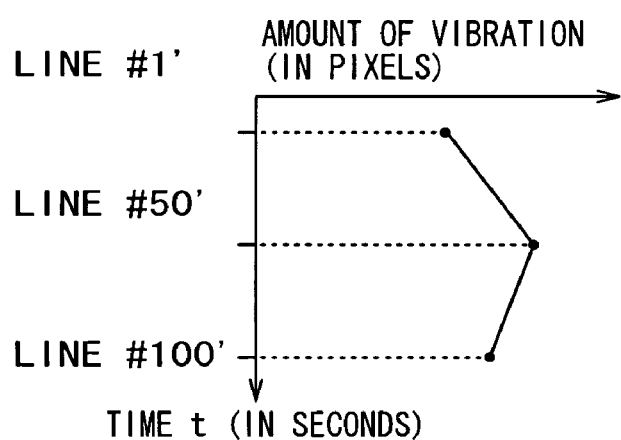
Figure 6C:
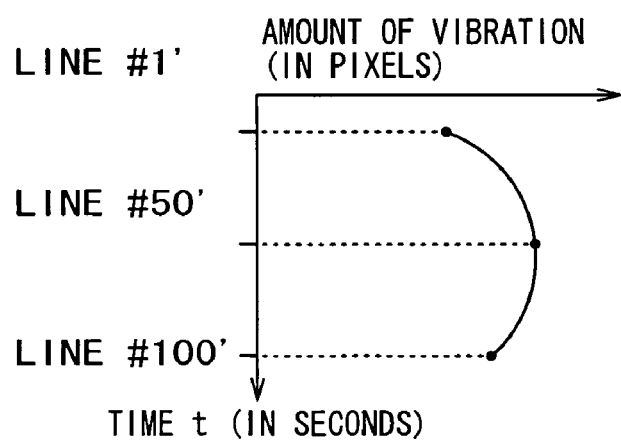

FIGS. 6A, 6B and 6C show how amounts of vibration are interpolated illustratively by the embodiment of this invention. As mentioned above, the shaky hand compensation amount calculation unit 120 acquires three amounts of vibration between line #1' and line #100'. The three acquired amounts of vibration are used as the basis for interpolating the amounts of vibration between lines #2 and #99 with the exception of line #50'. In principle, the amount of vibration regarding a given line is applied to some lines preceding and following the line in question for interpolation purposes. More specifically, as shown in FIG. 6A, the amount of vibration obtained for line #1' is applied to lines #2' through #40' for interpolation; the amount of vibration acquired for line #50' is applied to lines #41' through #60' for interpolation; and the amount of vibration gained for line #100' is applied to lines #61' through #99' for interpolation.

Alternatively, a linear function may be used for interpolation purposes as shown in FIG. 6B. In this case, the linear function involving two amounts of vibration regarding lines #1' and #50' is used to interpolate amounts of vibration for lines #2' through #49'; the linear function involving two amounts of vibration with respect to lines #50' and #100' is used to interpolate amounts of vibration for lines #51' through #99'.

As another alternative, a function other than the linear function may be utilized for interpolation as indicated in FIG. 6C. The example in FIG. 6C is basically the same as what is shown in FIG. 6B except that a function other than the linear function is employed for the calculation. The shaky hands do not always swing in the same direction at the same speed. For that reason, the result of interpolation often turns out to be more appropriate with a curvilinearly changing function as shown in FIG. 6C than with the linear function that varies in linear fashion.

The choice of a technique for compensation amount calculation from the candidates in FIGS. 6A through 6C depends on the processing capability of the image processing apparatus 100. If the image processing apparatus 100 is composed of a microcomputer, then one of the techniques in FIGS. 6A through 6C may be adopted to interpolate the acquired amounts of compensation in keeping with the performance of the microcomputer. More specifically, where the microcomputer has a relatively low processing capability, the amounts of compensation may be interpolated by the microcomputer using the technique of FIG. 6A for addressing limited quantities of computations. If the microcomputer has a relatively high processing capability, the amounts of compensation may be interpolated by the microcomputer resorting to the technique of FIG. 6C for dealing with relatively large quantities of computations.

After the amount of vibration is acquired for each of the lines involved on the basis of the discrete amounts of vibration, the shaky hand compensation amount calculation unit 120 calculates amounts of compensation necessary for offsetting the effects of the detected vibrations on the image processing apparatus 100. For example, if the amount of vibration for line #1' consists of P1 pixels, then the vibrations may be offset (i.e., the original vibration-free state restored) by calculating a compensation amount of −P1 pixels formed by the same absolute value as the detected vibrations prefixed with the opposite sign.

Figure 7A:
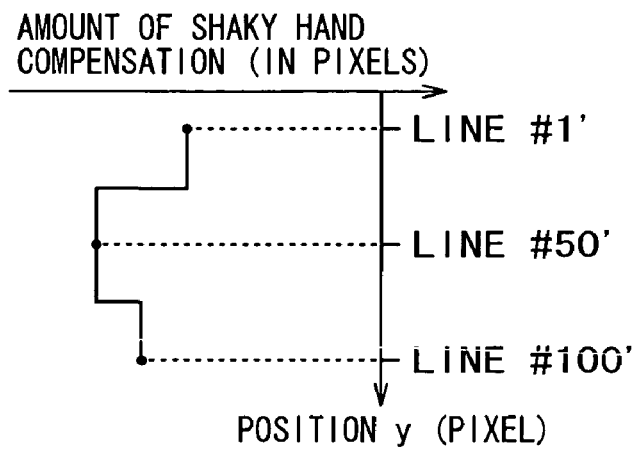
FIGS. 7A, 7B and 7C are schematic views outlining how amounts of compensation are calculated by the embodiment.
Figure 7B:
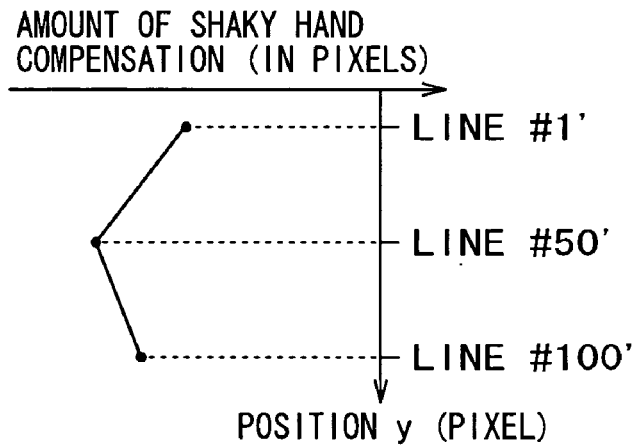
Figure 7C:
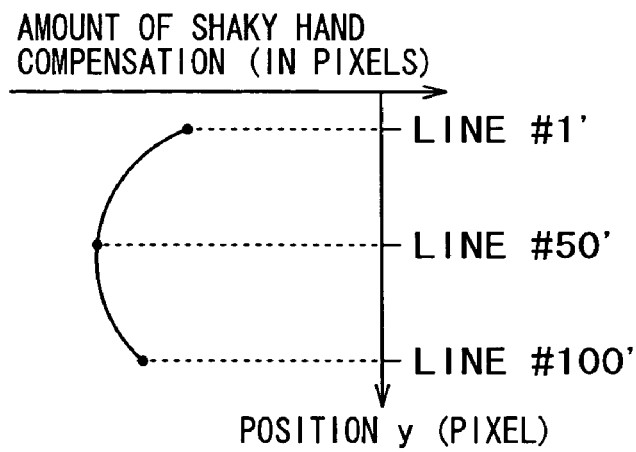

FIGS. 7A, 7B and 7C depict examples in which amounts of compensation are calculated by the embodiment. FIG. 7A shows the amounts of shaky hand compensation calculated by the shaky hand compensation amount calculation unit 120 using the technique of vibration amount interpolation discussed with reference to FIG. 6A. FIG. 7B indicates the amounts of shaky hand compensation calculated by the shaky hand compensation amount calculation unit 120 using the technique of vibration amount interpolation described with reference to FIG. 6B. FIG. 7C illustrates the amounts of shaky hand compensation calculated by the shaky hand compensation amount calculation unit 120 using the technique of vibration amount interpolation mentioned with reference to FIG. 6C.

The processes to be carried out by the compensation change amount calculation unit 130, compensation limit determination unit 140, and shaky hand compensation amount adjustment unit 150 of this embodiment will now be described.

Figure 8:
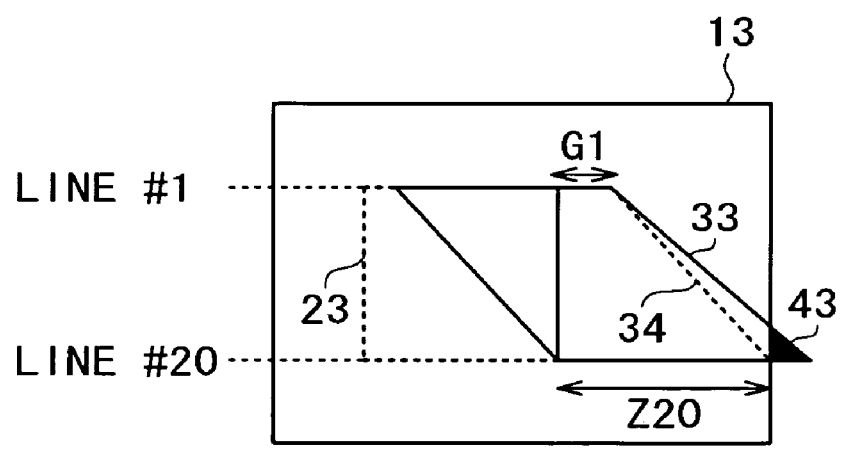
FIG. 8 is a schematic view depicting relations between a limit of compensation for vibration from shaky hands on the one hand, and a tolerable amount of compensation on the other hand.

FIG. 8 schematically depicts relations between a limit of compensation for vibration from shaky hands on the one hand, and a tolerable amount of compensation on the other hand. In FIG. 8, a picture data area 13 provided in the memory 170 is shown storing a picture 33 taken of an original object 23 under the influence of shaky hands. The picture 33 has its corner 43 overflowing the picture data area 13. That is, a limit of compensation is exceeded. In this case, the data effectively held in the picture data area 13 covers the picture 33 minus its corner 43.

What follows is a description of a first method that uses a uniformly changing amount as the reference by which to determine the breach of a limit of compensation. In FIG. 8, the amount of vibration for line #1 is represented by G1, and a maximum compensation amount tolerated for the last line #20 in the picture data area 13 is denoted by Z20. In this example, an amount of change $\Delta(Z20-G1)$ in compensation is obtained through linear approximation of the amounts G1 and Z20 between lines #1 and #20. The value $\Delta(Z20-G1)$ is an average value acquired by uniformly distributing to each line the amount of change in the tolerable amount of compensation between lines #1 and #20. It should be noted that an amount of change $\Delta(Gx-Gy)$ represents an inclination terminating with Gx and Gy. This leads to the following expression:

$$\Delta(Gx-Gy)=(Gx-Gy)/(x-y)$$

That is, no limit of compensation is exceeded if the amount of change in compensation from one line to another does not exceed $\Delta(Z20-G1)$. In other words, the amount of change $\Delta(Z20-G1)$ denotes a limit value that uniformly defines the tolerable amount of change between lines. This value is shown as a limit value 34 in FIG. 8.

Although the lines for which the limit value is calculated are the first and the last lines of the picture in the above example, this is not limitative of the invention. A spacing between any desired lines may be selected instead for the calculation. The same technique can be applied to vibrations from shaky hands in the vertical direction as well. It is also possible to perform the process of shaky hand compensation in the horizontal and vertical directions at the same time.

FIG. 9 is a block diagram of a functional setup implemented by the inventive image processing apparatus 100 operating by the first method described above. In this setup, the compensation limit determination unit 140 includes a limit value holding unit 141 and a comparator 142, and the shaky hand compensation amount adjustment unit 150 includes an adjusted amount calculation unit 151 and a final compensation amount selection unit 152.

The limit value holding unit 141 holds a limit value with regard to a given amount of change in compensation. In the example of FIG. 8, the amount of change $\Delta(Z20-G1)$ is held by the limit value holding unit 141. The comparator 142 compares the amount of change in compensation from the compensation change amount calculation unit 130, with the limit value held in the limit value holding unit 141, in order to determine whether the amount of change in compensation has exceeded the limit value.

The adjusted amount calculation unit 151 calculates an adjusted amount based on the amount of shaky hand compensation coming from the shaky hand compensation amount calculation unit 120. The adjusted amount is a value obtained by reducing the amount of shaky hand compensation. Illustratively, the adjusted amount is acquired by lowering the rate of compensation using suitable gain control measures or by subtracting a predetermined value from the calculated amount, so as to attenuate the degree of compensation. The adjusted amount may also be varied depending on the result of the comparison made by the comparator 142 in the compensation limit determination unit 140.

Given the result of the comparison from the comparator 142 in the compensation limit determination unit 140, the final compensation amount selection unit 152 selects either the amount of shaky hand compensation from the shaky hand compensation amount calculation unit 120 or the adjusted amount from the adjusted amount calculation unit 151. More specifically, if the amount of change in compensation is not found to exceed the limit value, the final compensation amount selection unit 152 selects the amount of shaky hand compensation from the shaky hand compensation amount calculation unit 120; if the amount of change is found to have exceeded the limit value, then the final compensation amount selection unit 152 selects the adjusted amount from the adjusted amount calculation unit 151. The final compensation amount selection unit 152 holds the selected value for a predetermined period of time and provides the retained value as the final amount of compensation.

The compensation change amount calculation unit 130 calculates the amount of change in compensation from both the amount of shaky hand compensation supplied by the shaky hand compensation amount calculation unit 120 and the final amount of compensation coming from the final compensation amount selection unit 152. More specifically, the amount of change $\Delta(Gx-Gy)$ is calculated, where Gy denotes the final amount of compensation for the immediately preceding line spacing and Gx represents the amount of compensation for the next line spacing.

FIG. 10 is a tabular view listing final amounts of compensation acquired by the inventive image processing apparatus 100 operating by the first method discussed above. In FIG. 10, the "Line" column indicates the line numbers such as those attached to the picture data area 13 in FIG. 8; the "Original Amount of Compensation" column indicates the amounts of shaky hand compensation calculated by the shaky hand compensation amount calculation unit 120; the "Amount of Change in Compensation" column shows the amounts of change in compensation calculated by the compensation change amount calculation unit 130; the "Adjusted Amount" column lists the adjusted amounts calculated by the adjusted amount calculation unit 151 in the shaky hand compensation amount adjustment unit 150; and the "Final Compensation Amount" column indicates the final amounts of compensation ultimately provided by the final compensation amount selection unit 152 in the shaky hand compensation amount adjustment unit 150.

In operation, the compensation change amount calculation unit 130 first calculates an amount of change in compensation $\Delta(A4-A1)$ between line #1 and line #4. If the compensation limit determination unit 140 finds the calculated amount to fall within the limits of compensation, then the shaky hand compensation amount adjustment unit 150 provides final amounts of compensation A1 through A4. Whereas FIG. 10 indicates B4 as the final amount of compensation for this line spacing, the amount has yet to be finalized at this point in processing. For the moment, the final amount of compensation is given as A4.

The compensation change amount calculation unit 130 then calculates an amount of change in compensation $\Delta(A7-A4)$ between line #4 and line #7. If the compensation limit determination unit 140 finds the calculated amount to be outside the limits of compensation, the shaky hand compensation amount adjustment unit 150 provides final amounts of compensation B4 through B7. This causes the final amount of compensation A4 acquired earlier to be replaced by the final amount of compensation B4, which is established here as final.

The compensation change amount calculation unit 130 further calculates an amount of change in compensation $\Delta(A10-B7)$ between line #7 and line #10. At this point, the amount of compensation for line #7 is given by the final amount of compensation B4. This makes it possible to calculate a more accurate amount of change in compensation, because the final amount of compensation after the adjustment, not before, is fed back for the calculation. If the compensation limit determination unit 140 finds the calculated amount $\Delta(A10-B7)$ to be outside the limits of compensation, the shaky hand compensation amount adjustment unit 150 provides final amounts of compensation C7 through C10.

The compensation change amount calculation unit 130 also calculates an amount of change in compensation $\Delta(A13-C10)$ between line #10 and line #13. At this point, the amount of compensation for line #10 is furnished by the final amount of compensation C10. If the compensation limit determination unit 140 finds the calculated amount $\Delta(A13-C10)$ to be outside the limits of compensation, the shaky hand compensation amount adjustment unit 150 provides final amounts of compensation A10 through A13. Alternatively, the line #10 as a boundary value may be furnished with the immediately preceding adjusted amount C10 as the final amount of compensation.

The steps above are repeated likewise. After an amount of change in compensation $\Delta(A20-A19)$ is calculated between line #19 and the last line #20, final amounts of compensation A19 and A20 are provided.

In the example of FIG. 10, the amount of change in compensation is selectively calculated every two lines. However, this is not limitative of the invention. Alternatively, the amount of change in compensation may be calculated at intervals of any number of lines as needed.

Figure 11A:
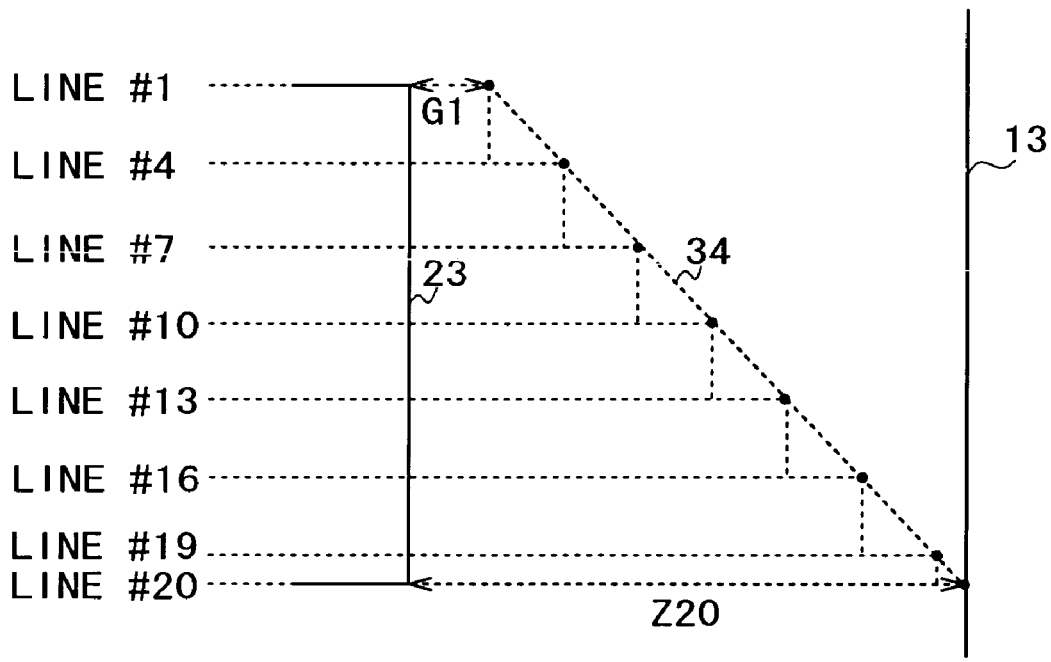
FIGS. 11A and 11B are graphic representations showing transitional amounts of compensation between lines provided by the inventive image processing apparatus.
Figure 11B:
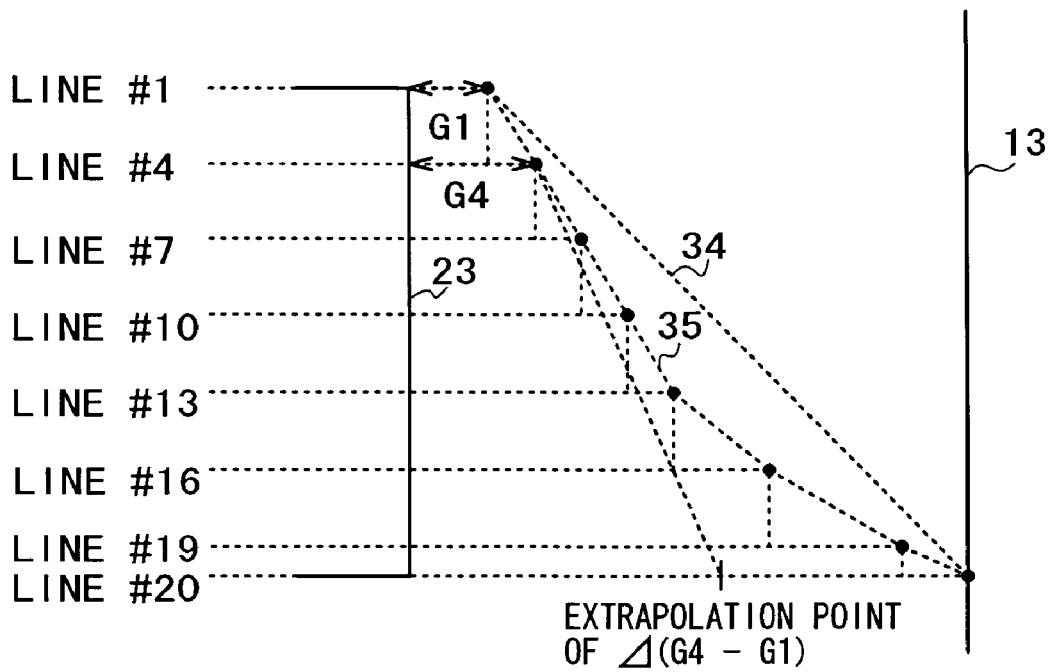

FIGS. 11A and 11B graphically show transitional amounts of compensation between lines provided by the inventive image processing apparatus. FIG. 11A indicates a series of limit values 34 acquired by the first method discussed above. Each of the values 34 represents the limit value of a vibration-triggered deviation from the original object 23 (picture). More specifically, with the amount of vibration for line #1 taken as the origin, the limit value 34 is defined linearly with respect to the maximum tolerable amount of compensation Z20 at an extremity of the picture data range 13 for line #20. The definition of the limit value 34 is based on the assumption that the tolerable amount of change is uniform from one line to the next. According to the first method, only one amount of change in the limit value 34 needs to be calculated, which minimizes the amount of calculations to be done.

On the other hand, as long as the amount of change is assumed to remain uniform from one line to another, the amount of compensation could be more restrictive than is necessary when the actual amount of change varies significantly between lines. There may well be cases such as one in FIG. 11B where the amount of change is small for lines with lower line numbers but is more pronounced for lines with higher line numbers. In such cases, an out-of-range situation could be recognized inadvertently between certain lines despite the fact that the limits of compensation are ultimately not exceeded.

A second method, to be described below, is proposed to bypass the above bottleneck. The second method involves using the extrapolation of the amount of change in compensation as the basis on which to determine whether the limits of compensation are exceeded. More specifically, the amount of change in compensation between given lines is extended to a predetermined line so as to obtain an extrapolation point representative of the extrapolated amount of change. A check is then made to determine whether that extrapolation point is located within the range of the picture data area. In the example of FIG. 11B, the amount of change in compensation between the amount of vibration G1 for line #1 and the amount of vibration G4 for line #4 is extrapolated to line #20.

The point of intersection with line #20 constitutes an extrapolation point of Δ(G4−G1), which is located inside the picture data area 13. Thus the limits of compensation are not found exceeded.

In the example of FIG. 11B, the extrapolation point representing the compensation amount of change between any two lines is found to fall within the picture data area 13. It follows that according to the second method, all amounts of compensation are found to exist within the limits of compensation, which is obviously correct as can be seen in the figure. However, if the first method were applied to the example of FIG. 11B, the inclination of the amount of change in compensation for line #13 and subsequent lines would exceed the inclination of the limit value 34. That would lead to the erroneous conclusion that the amount of change in compensation is outside the tolerable range of compensation. Because the second method adopts for a given line spacing a different criterion with regard to the inclination of the amount of change in compensation, the second method can deal with the calculations of compensation more flexibly than the first method.

Although the last line is used as the basis for determining whether any limit of compensation is exceeded in the examples of FIGS. 11A and 11B, this is not limitative of the invention. Alternatively, a different line may be used as the basis for such determination for each line spacing.

Figure 12:
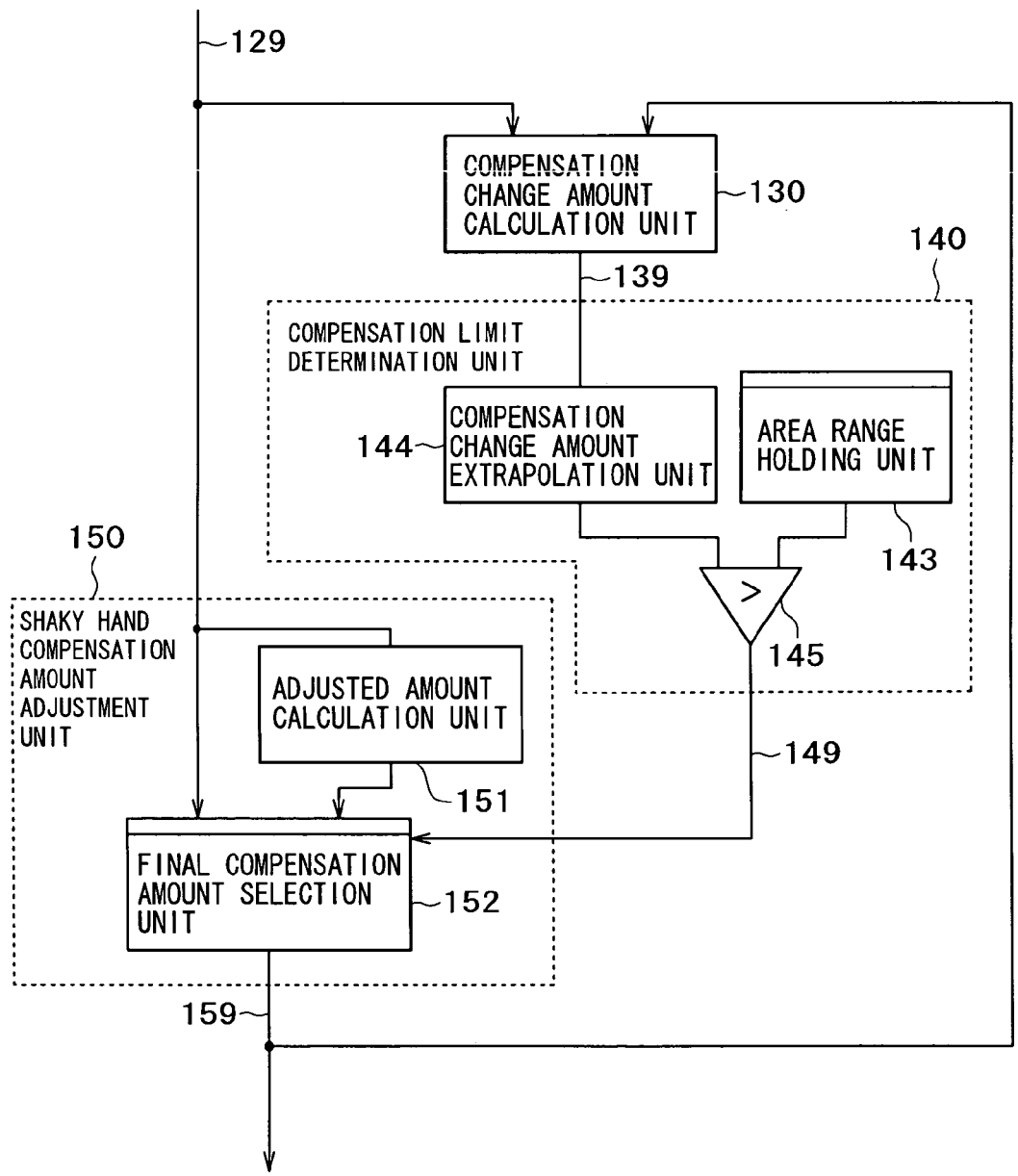
FIG. 12 is a block diagram of a functional setup implemented by the inventive image processing apparatus operating by a second method of this invention.

FIG. 12 is a block diagram of a functional setup implemented by the inventive image processing apparatus 100 operating by the second method of this invention. In this setup, the compensation limit determination unit 140 includes an area range holding unit 143, a compensation change amount extrapolation unit 144, and a comparator 145. As with the functional setup in FIG. 9 based on the first method, the shaky hand compensation amount adjustment unit 150 in the setup of FIG. 12 includes the adjusted amount calculation unit 151 and final compensation amount selection unit 152.

The area range holding unit 143 holds the range of the picture data area for a given line. In the example of FIG. 11B, the area range holding unit 143 holds the range inside the limits of the picture data area 13 for line #20 in increments of pixels.

The compensation change amount extrapolation unit 144 calculates an extrapolation value for a given line based on the amount of change in compensation supplied by the compensation change amount calculation unit 130. In the example of FIG. 11B, the compensation change amount extrapolation unit 144 calculates an extrapolation value for line #20 on the basis of the amount of change in compensation Δ(G4−G1) between lines #1 and #4.

The comparator 145 compares the range of the picture data area supplied by the area range holding unit 143, with the value of the extrapolation point coming from the compensation change amount extrapolation unit 144, in order to determine whether the extrapolation point is located within the range of the picture data area.

As with the setup in FIG. 9, the adjusted amount calculation unit 151 calculates an adjusted amount based on the amount of shaky hand compensation supplied by the shaky hand compensation amount calculation unit 120. Alternatively, the adjusted amount calculation unit 151 may vary the adjusted mount in keeping with the result of the comparison by the comparator 145 in the compensation limit determination unit 140.

Depending on the result of the comparison by the comparator 145 in the compensation limit determination unit 140, the final compensation amount selection unit 152 selects either the amount of shaky hand compensation from the shaky hand compensation amount calculation unit 120 or the adjusted amount from the adjusted amount calculation unit 151. That is, if the extrapolation point is found to exist within the range of the picture data area, the final compensation amount selection unit 152 selects the amount of shaky hand compensation supplied by the shaky hand compensation amount calculation unit 120; if the extrapolation point is not found within the range of the picture data area, then the final compensation amount selection unit 152 selects the adjusted amount fed by the adjusted amount calculation unit 151. The final compensation amount selection unit 152 retains the selected value for a predetermined period of time and provides the retained value as the final amount of compensation.

As in the case of the setup in FIG. 9, the compensation change amount calculation unit 130 calculates the amount of change in compensation from the amount of shaky hand compensation supplied by the shaky hand compensation amount calculation unit 120 as well as from the final amount of compensation fed by the final compensation amount selection unit 152.

The first and the second methods described above should preferably be used selectively as needed in order to make the most of their respective advantages. For example, if the image processing apparatus is set for moving picture mode, the second method should preferably be adopted to deal flexibly with varying amounts of variation. If the image processing apparatus is to operate in still picture mode, the first method is preferred for its reduced load of calculations because the moving picture appearing on the screen is only for monitoring purposes and is not destined for storage. The two methods may be switched automatically depending on the imaging mode in effect, or one of them may be set manually by the user.

Figure 13:
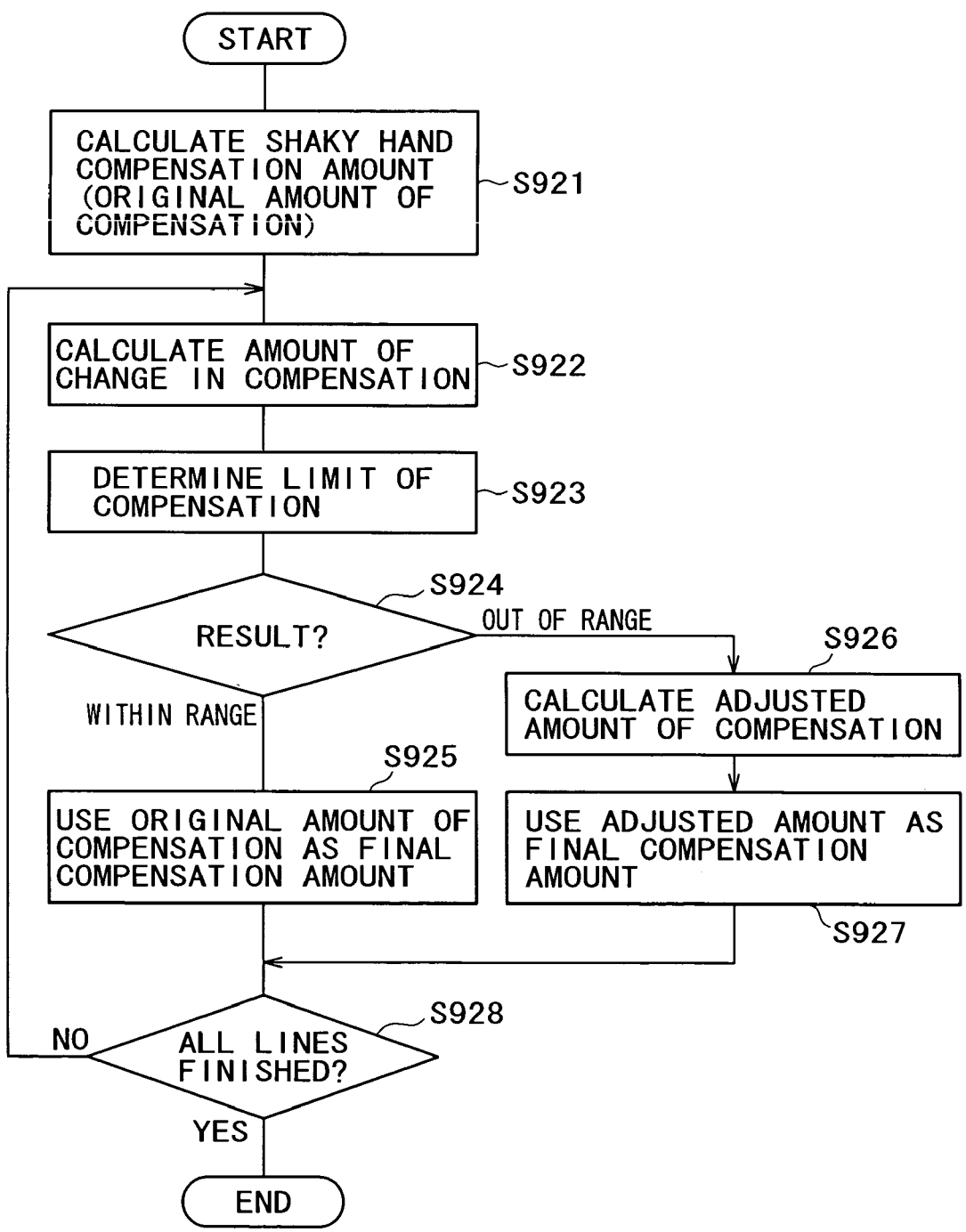
FIG. 13 is a flowchart of step carried out by the inventive image processing apparatus to calculate amounts of compensation.

How the image processing apparatus 100 according to the invention works will now be described with reference to the applicable drawings. FIG. 13 is a flowchart of step carried out by the inventive image processing apparatus 100 to calculate amounts of compensation. In step S921, the detected amount of vibration from shaky hands is interpolated for each line in order to calculate the amount of compensation. The amount of compensation calculated in this step is called the original amount of compensation.

In step S922, an amount of change in compensation is calculated on the basis of the original amount of compensation (or the final amount of compensation). Where the amount of change in compensation is calculated, a reference line for each line spacing (line #7 as opposed to line #10 in the example of FIG. 10) is furnished with the final amount of compensation and the other line is provided with the original amount of compensation for the calculation.

In step S923, a check is made to determine whether the amount of change in compensation thus calculated exceeds any limit of compensation. If the calculated amount of change is found to fall within the range of the compensation limits in step S924, then the original amount of compensation is used unadjusted as the final amount of compensation in step S925. If the calculated amount of change is found to be outside the range of the compensation limits in step S924, then an adjusted amount is calculated with respect to the original amount of compensation in step S926. In step S927, the adjusted amount is provided as the final amount of compensation.

Step S922 and subsequent steps are then repeated for all lines. When the amounts of compensation are found to have been calculated for all lines in step S928, the compensation amount calculating process is brought to an end.

The above-described steps constituting the compensation amount calculating process may be executed either by hardware or by software. For the software-based process to be carried out, the program constituting the software may be either incorporated beforehand in dedicated hardware of a computer or installed upon use from a suitable recording medium into a general-purpose personal computer or like equipment capable of executing diverse functions based on the installed programs.

Figure 14:
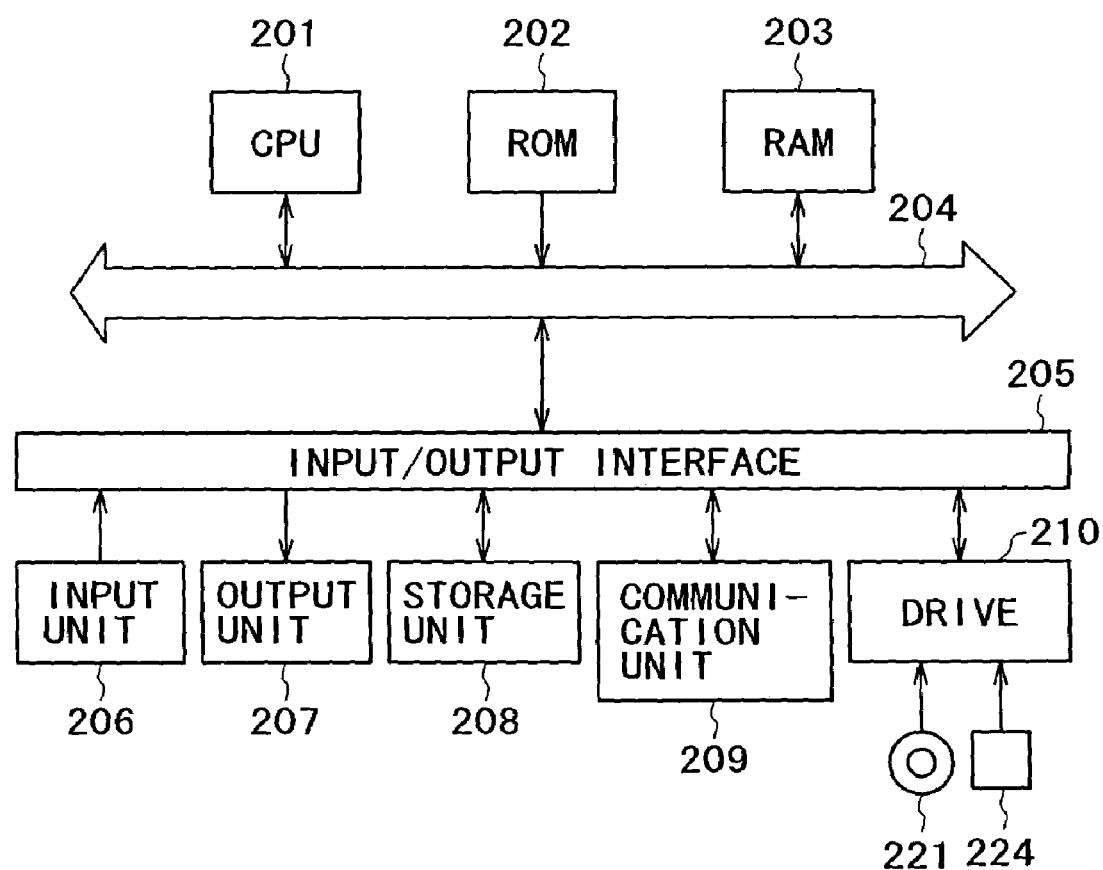
FIG. 14 is a block diagram of a computer for implementing the capabilities of the inventive image processing apparatus.

In conjunction with the recording medium, a typical personal computer for handling the medium is explained briefly below. FIG. 14 shows a typical internal structure of a general-purpose personal computer. A CPU (Central Processing Unit) 201 of the personal computer carries out diverse processes in accordance with programs held in a ROM (Read Only Memory) 202. A RAM (Random Access Memory) 203 accommodates the programs or data to be carried out or operated on by the CPU 201 as needed.

An input/output interface 205 is connected with an input unit 206 made up of a keyboard and a mouse. Signals entering the input unit 206 are forward through the interface 205 to the CPU 201. The input/output interface 205 is also connected with an output unit 207 formed by a display device and speakers.

The input/output interface 205 is further connected with a storage unit 208 such as a hard disk drive, and with a communication unit 209 that exchanges data to and from other apparatuses via a network such as the Internet. A drive 210 connected to the input/output interface 205 accommodates recording media such as disks 221 including a magnetic disk, an optical disk and a magneto-optical disk, or a semiconductor memory 224. With any one of these media loaded, the drive 210 writes and reads data to and from the loaded medium.

As shown in FIG. 14, the recording medium is offered to users apart from the computer not only as a package medium constituted by magnetic disks (including flexible disks), optical disks (including CD-ROM (Compact Disc-Read Only Memory) and DVD (Digital Versatile Disc)), magneto-optical disks (including MD (Mini-disc; registered trademark)), or a semiconductor memory 224, each of the media carrying the relevant programs; but also in the form of the ROM 202 or the hard disk drive containing the storage unit 208, both accommodating the programs and incorporated beforehand in the computer.

In this specification, the steps which are stored on the recording medium and which describe the programs to be executed represent not only the processes that are to be carried out in the depicted sequence (i.e., on a time series basis) but also processes that may be performed parallelly or individually.

According to the invention, as described, the compensation limit determination unit 140 checks to determine whether any limit of compensation is exceeded in the picture data area. Depending on the result of the check, the shaky hand compensation amount adjustment unit 150 adjusts the amount of shaky hand compensation in such a manner that the picture having exceeded the compensation limit will not appear unnatural or awkward when corrected.

The processing steps described above may be regarded as a method including these steps, as a program for causing a computer to carrying out the steps, or as a recording medium which stores that program.

Illustratively, this invention may be adapted advantageously to applications in which the adverse effects of shaky hands on the image processing apparatus need to be offset.

The foregoing description of the preferred embodiments has indicated specific examples supporting what is claimed. If any example of the invention described above as a preferred embodiment does not have an exactly corresponding claim, this does not means that the example in question has no relevance to the claims. Conversely, if any example of the invention described above has a specifically corresponding claim, this does not mean that the example in question is limited to that claim or has no relevance to other claims.

As many apparently different embodiments of this invention may be made without departing from the spirit and scope thereof, it is to be understood that the invention is not limited to the specific embodiments thereof except as defined in the appended claims.

What is claimed is:

1. An image processing apparatus comprising:
an imaging unit configured to take a picture of an object using an image pickup device; a picture storing unit configured to store said picture taken; a vibration detecting unit configured to detect an amount of vibration applied to said imaging unit and to output the detected amount of vibration; a compensation amount calculating unit configured to calculate an amount of compensation necessary for offsetting effects of said vibration on said imaging unit in accordance with said amount of vibration at a plurality of predetermined positions in the picture, wherein said plurality of predetermined positions are line positions of said picture storing unit; a change amount calculating unit configured to calculate an amount of change in said amount of compensation between at least two pairs of said plurality of predetermined positions; a compensation limit determining unit configured to determine whether a limit of the compensation available for said picture stored in said picture storing unit is exceeded by said amount of change for each of said at least two pairs; a compensation amount adjusting unit configured to adjust said amount of compensation depending on whether said limit of said compensation is exceeded, before outputting the adjusted amount of compensation; and a picture correcting unit configured to correct said picture stored in said picture storing unit on the basis of said adjusted amount of compensation output by said compensation amount adjusting unit.

2. An image processing apparatus according to claim 1, wherein said image pickup device is accessed by use of two-dimensional addresses.

3. An image processing apparatus according to claim 1, wherein said image pickup device is a complementary metal oxide semiconductor image sensor.

4. An image processing apparatus according to claim 1, wherein said compensation limit determining unit further comprises:
a limit value holding unit configured to hold a limit value that uniformly defines a tolerable amount of change between two of said plurality of predetermined positions; and
a determining unit configured to determine whether said limit of said compensation is exceeded when said limit value is exceeded by said amount of change calculated by said change amount calculating unit.

5. An image processing apparatus according to claim 4, wherein said limit value is a value that uniformly distributes to each of said predetermined positions a difference between an amount of compensation in a start position and an amount of compensation in an end position.

6. An image processing apparatus according to claim 4, wherein said limit value is a value that evenly distributes to each of said plurality of predetermined positions a difference between an amount of compensation in a position other than a start position on one hand, and an amount of compensation in a position other than an end position on an other hand.

7. An image processing apparatus according to claim 1, wherein said compensation limit determining unit further comprises:
a range holding unit configured to hold a range of said plurality of predetermined positions for said picture storing unit;
an extrapolating unit configured to calculate an extrapolation value for said plurality of predetermined positions based on said amount of change calculated by said change amount calculating unit; and
a determining unit configured to determine whether said limit of said compensation is exceeded when said range held by said range holding unit is exceeded by said extrapolation value.

8. An image processing apparatus according to claim 1, wherein said compensation amount adjusting unit further comprises:
an adjusted amount calculating unit configured to make a predetermined calculation on said amount of compensation to acquire an adjusted amount; and
a final compensation amount selecting unit configured to output said adjusted amount as said amount of compensation if said compensation limit determining unit determines that said limit of said compensation is exceeded, said final compensation amount selecting unit further configured to output said amount of compensation unadjusted if said compensation limit determining unit determines that said limit of said compensation is not exceeded.

9. An image processing apparatus according to claim 1, wherein said vibration detecting unit is configured to interpolate the amount of vibration in a first position of said imaging unit so as to acquire an amount of vibration in a second position close to said first position.

10. An image processing apparatus according to claim 1, wherein said vibration detecting unit is configured to perform an interpolation involving application of a predetermined linear function to the amounts of vibration in a first and a second position of said imaging unit so as to acquire an amount of vibration in a third position located between said first and said second positions of said imaging unit.

11. An image processing apparatus according to claim 1, wherein said compensation amount calculating unit is configured to perform an interpolation involving application of a curvilinearly changing function to the amounts of vibration in a first and a second position of said imaging unit so as to acquire an amount of vibration in a third position located between said first and said second positions of said imaging unit.

12. An image processing apparatus according to claim 1, wherein said compensation limit determining unit further comprises:
a limit value holding unit configured to hold a limit value that uniformly defines a tolerable amount of change between two of said plurality of predetermined positions;
a first determining unit configured to determine whether said limit of said compensation is exceeded when said limit value is exceeded by said amount of change calculated by said change amount calculating unit;
a range holding unit configured to hold a range of said plurality of predetermined positions for said picture storing unit;
an extrapolating unit configured to calculate an extrapolation value for said plurality of predetermined positions based on said amount of change calculated by said change amount calculating unit; and
a second determining unit configured to determine whether said limit of said compensation is exceeded when said range held by said range holding unit is exceeded by said extrapolation value.

13. An image processing apparatus according to claim 12, wherein either said first determining unit or said second determining unit is utilized depending on image pickup mode in effect.

14. A compensation amount calculating method for use with an image processing apparatus including, an imaging unit configured to take a picture of an object using an image pickup device; a picture storing unit configured to store said picture taken; vibration detecting unit configured to detect an amount of vibration applied to said imaging unit and to output the detected amount of vibration; and a picture correcting unit configured to correct said picture stored in said picture storing unit in accordance with said amount of compensation ultimately obtained on the basis of said amount of vibration, said compensation amount calculating method comprising: calculating the amount of compensation necessary for offsetting effects of said vibration on said imaging unit in accordance with said amount of vibration at a plurality of predetermined positions in the picture, wherein said plurality of predetermined positions are line positions of said picture storing unit; calculating an amount of change in said amount of compensation between at least two pairs of said plurality of predetermined positions; determining whether a limit of the compensation available for said picture stored in said picture storing unit is exceeded based on said amount of change for each of the at least two pairs; and making a predetermined calculation on said amount of compensation to acquire an adjusted amount before outputting said adjusted amount as said amount of compensation if said limit of said compensation is found to have been exceeded, said amount of compensation being output unadjusted if said limit of said compensation is not found to have been exceeded.

15. A computer readable medium including computer executable instructions which, when loaded into an image processing apparatus including, an imaging unit configured to take a picture of an object using an image pickup device; a picture storing unit configured to store said picture taken; a vibration detecting unit configured to detect an amount of vibration applied to said imaging unit and outputting the detected amount of vibration; and a picture correcting unit configured to correct said picture stored in said picture storing unit in accordance with said amount of compensation ultimately obtained on the basis of said amount of vibration, cause the apparatus to execute a method comprising: calculating an amount of compensation necessary for offsetting effects of said vibration on said imaging unit in accordance with said amount of vibration at a plurality of predetermined positions in the picture, wherein said plurality of predetermined positions are line positions of said picture storing unit; calculating an amount of change in said amount of compensation between at least two pairs of said plurality of predetermined positions; determining whether a limit of the compensation available for said picture held in said picture storing unit is exceeded based on said amount of change for each of the at least two pairs; and making a predetermined calculation on said amount of compensation to acquire an adjusted amount before outputting said adjusted amount as said amount of compensation if said limit of said compensation is found to have been exceeded, said amount of compensation being output unadjusted if said limit of said compensation is not found to have been exceeded.

* * * * *